(12) United States Patent
Guthrie

(10) Patent No.: X8376
(45) Date of Patent: Aug. 20, 1834

(54) PERCUSSION, POWDER, FOR DISCHARGING ARMS

(76) Inventor: Samuel Guthrie

Samuel Guthrie, Sacketts Harbour, New York.

Letters Patent no drawing

The schedule referred to in these Letters Patent and making part of the same con
taining a description in the words of the said Samuel Guthrie himself of his im
provement in the manufacturing of percussion powder to be used in the discharge
of fire arms.

To all to whom these presents shall come Be it known that I Samuel Guthrie of Sacketts
Harbour in the county of Jefferson and State of New York have invented an improve
ment in the manufacturing of percussion powder for the discharging of fire arms
and I do hereby declare that the following is a full and exact description thereof.
I prepare the percussion powder from any
of the materials employed for that purpose using fulminating mercury, detonating
silver and oxide of [illegible], or regulus of antimony chlorate of potash with charcoal
sulphur, sulphuret of antimony or any mixture of substances capable of inflaming
gun powder by percussion forming the same into a paste and granulating by pro
cesses which are well known sometimes making the grains of a small size like
those of ordinary Gun powder at other times I make them of such size that a single
grain suffices for a priming and is substituted for the copper caps used in fowl
ing pieces muskets &c or still larger so that they may be used for the discharge
of ordnance of all descriptions. These grains are so compounded that they are hard
enough to be packed up and carried about without being liable to be crushed by their
abrasion against each other or by any force to which they are ordinarily subjec
ted. These grains are rendered water proof by coating them with shellac dis
solved in alcohol or any other resinous varnish. Such powder I have for some
time been in the habit of manufacturing and vending but I have recently made
an improvement therein which is as follows.
Before the varnish with which the grains are coated is perfectly
dry I cover or coat them with some metallic substance, and this I do by taking
leaf metal or any of the metallic powders known under the name of bronze [illegible]
[illegible] sulphurate of tin, or any other metal or metalline compound, and in these I

United States Patent

Patent No.: X8376 roll the grains whilst yet tacky with the varnish. The powder thus prepared is not only
improved in appearance but has greater smoothness and durability than before. After
thus coating the grains I sometimes apply another covering of copal or other water
proof varnish being governed in this particular by the nature of the powder or the pur
=pose to which it is to be applied. What I claim as my invention and wish to have se
=cured to me by Letters Patent is the giving to the granulated powder a metallic co
=vering in the manner and for the purpose herein set forth Samuel Guthrie Exd.
WJC Witnesses
T. H. Chamberlin
H. Chamberlin Not necessary

[illegible]